US005227017A

United States Patent [19]

Tanaka et al.

[11] Patent Number: 5,227,017

[45] Date of Patent: Jul. 13, 1993

[54] SPRAY DRYING APPARATUS EQUIPPED WITH A SPRAY NOZZLE UNIT

[75] Inventors: Toshiyuki Tanaka; Akira Kodera, both of Yokohama, Japan

[73] Assignee: Ohkawara Kakohki Co., Ltd., Japan

[21] Appl. No.: 563,142

[22] Filed: Aug. 6, 1990

Related U.S. Application Data

[63] Continuation of Ser. No. 359,271, May 31, 1989, abandoned.

[30] Foreign Application Priority Data

Jan. 29, 1988 [JP] Japan ........ 63-19008

[51] Int. Cl.[5] ........ B01D 1/16

[52] U.S. Cl. ........ 159/4.01; 159/4.2; 159/16.1; 159/48.1; 202/236; 203/90; 239/406

[58] Field of Search ........ 159/401, 16.1, 4.2, 159/48.1; 202/236; 203/49, 90; 34/10, 57 R; 239/426, 524, 405, 406

[56] References Cited

U.S. PATENT DOCUMENTS

| | | | |
|---|---|---|---|
| 3,082,098 | 3/1963 | Bergquist | 159/4.01 |
| 3,790,086 | 2/1974 | Masai | 239/406 |
| 3,883,076 | 5/1975 | Vorms et al. | 239/405 |
| 3,887,137 | 6/1975 | Nakamura et al. | 239/468 |
| 4,158,092 | 6/1979 | Botsch et al. | 159/DIG. 10 |
| 4,323,424 | 4/1982 | Secunda et al. | 159/48.1 |
| 4,335,677 | 6/1982 | Nagata et al. | 118/306 |
| 4,380,491 | 4/1983 | Voy et al. | 159/4.01 |
| 4,571,311 | 2/1986 | Ferguson, Jr. et al. | 159/4.01 |
| 4,600,472 | 7/1986 | Pitchon et al. | 159/48.1 |
| 4,610,760 | 9/1986 | Kirpatrick et al. | 159/48.1 |
| 4,619,843 | 10/1986 | Mutsers | 159/48.1 |
| 4,659,011 | 4/1987 | Moos | 239/405 |

FOREIGN PATENT DOCUMENTS

| | | | |
|---|---|---|---|
| 0609187 | 11/1960 | Canada . | |
| 0182545 | 5/1986 | European Pat. Off. | 239/406 |
| 2544306 | 4/1976 | Fed. Rep. of Germany | 239/406 |
| 1577859 | 5/1978 | Fed. Rep. of Germany | 239/406 |
| 938920 | 10/1948 | France . | |
| 0132655 | 10/1980 | Japan | 239/406 |
| 0143160 | 8/1983 | Japan | 239/40 |
| 0614821 | 7/1978 | U.S.S.R. | 239/405 |
| 1214226 | 2/1986 | U.S.S.R. | 239/405 |
| 0869143 | 5/1961 | United Kingdom . | |
| 1371153 | 10/1974 | United Kingdom | 239/405 |

OTHER PUBLICATIONS

Roget's International Thesaurus, 3rd edition p. 190.

*Primary Examiner*—Virginia Manoharan
*Attorney, Agent, or Firm*—Parkhurst, Wendel & Rossi

[57] ABSTRACT

A nozzle unit having a pressure nozzle for spraying feed liquid and a cylindrical outer tube disposed around the pressure nozzle for high-speed gas blowing. The tip of the nozzle unit is of converging construction. When the feed liquid water is sprayed at low pressure in the nozzle unit, the feed liquid is atomized to fine droplets.

1 Claim, 4 Drawing Sheets

SPRAY DRYING APPARATUS EQUIPPED WITH A SPRAY NOZZLE UNIT

This application is a Rule 60 Continuation of parent application Ser. No. 07/359,271, filed May 31, 1989, abandoned.

FIELD OF THE INVENTION

The present invention relates to a spray nozzle unit which can function satisfactory even when low pressure is applied during a period of start-up, and a spray drying apparatus equipped with the nozzle unit.

BACKGROUND OF THE INVENTION

In general, temperatures in a spray drying chamber should be stabilized in a start-up period to avoid product overheating and to provide thermal protection of equipment downstream of the spray drying chamber. Therefore, water is usually injected through the same pressure nozzle as used for a feed liquid.

The rate of water to be sprayed must be equivalent to the water content of the feed liquid, which is usually in the range of 30–80 % by weight. Thus, the rate of water to be sprayed is also 30–80 % by weight of that of the feed liquid. Because of pressure nozzle characteristics, the spray nozzle pressure decreases to 10–80 %, depending on the liquid viscosity when this low rate of water is fed. Water droplets thus produced are likely to be so coarse that they may adhere to the surface inside the drying chamber. Subsequent spraying of the feed liquid causes dried powder to adhere to the wet surface to form deposits.

According to the prior art, devices as shown in FIGS. 6 and 7 are used to cope with this situation. In FIG. 6, a plurality of spray nozzles 10 are disposed at the top of the inside of the spray drying chamber When water is injected for spraying, the number of spray nozzles used is limited to avoid low pressure spraying. On the other hand,. FIG. 7 illustrates an example in which a water spray nozzle 11 is disposed separately from a feed liquid spray nozzle 12.

However, the device of FIG. 6 has disadvantages of uneven liquid droplet dispersion and nonuniform temperature distribution because of a relatively large distance between the nozzles and the very existence of unused spray nozzles. In addition, plugging problems are likely to occur around the nozzles left unused when water is injected.

On the other hand, the device of FIG. 7 has a disadvantage of feed liquid clogging inside the feed liquid spray nozzle since cooling or flushing cannot be conducted through the feed nozzle.

In view of the foregoing disadvantages of the prior art, it is one object of the present invention to provide a spray nozzle and a spray drying apparatus using the spray nozzle, in which water is atomized into such fine particles as to permit complete drying and is used to cool the spray nozzle as well to prevent plugging of feed liquid.

SUMMARY OF THE INVENTION

In order to attain the above object, the present invention provides a nozzle unit comprising a pressure nozzle for spraying feed liquid, and a cylindrical outer tube disposed around said pressure nozzle for high-speed gas blowing, characterized by the converging construction of the tip of the nozzle unit. A spray drying apparatus using nozzle unit is further provided according to this invention.

A gas slit for providing swirling motion in a high-speed gas stream is desirably formed between the pressure nozzle and the cylindrical outer tube to obtain the larger spray angle of liquid droplets.

According to the present invention, a gas is blown at high speed through the annulus formed between the pressure nozzle and the cylindrical outer tube so as to atomize water into very fine droplets even when only low pressure, which would otherwise produce coarse droplets, is applied in the pressure nozzle. Therefore, complete drying is carried out, and no water droplets adhere to the inside wall of the spray drying apparatus.

BRIEF DESCRIPTION OF THE DRAWINGS

FIGS. 3 (*a*), (*b*) and (*c*) are a top plan view, a bottom plan view, and a side view, respectively.

DETAILED DESCRIPTION OF THE INVENTION

In the following examples are described preferred embodiments to illustrate the present invention with particular reference to the drawings. However, it is to be understood that the invention is not intended to be limited to the specific embodiments.

Figure 1:
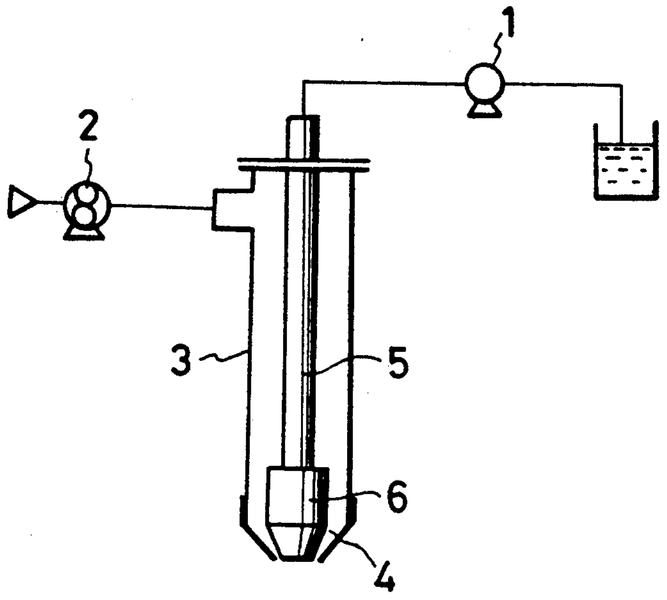
FIG. 1 illustrates a preferred embodiment of the nozzle unit of the present invention.
Figure 2:
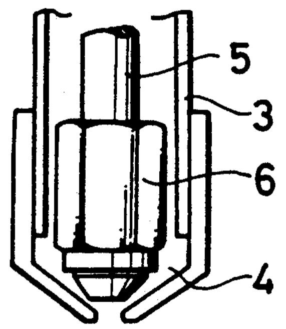
FIG. 2 shows a partial cross sectional view of the end portion of the nozzle unit illustrated in FIG. 1.

FIG. 1 illustrates a preferred embodiment of the nozzle unit of the present invention. FIG. 2 shows a partial cross-sectional view of the end portion of the nozzle unit illustrated in FIG. 1.

Referring now to the drawings, a feed liquid (or water) pump 1, a Roots blower 2, a jacket pipe 3, an air nozzle 4, a feed liquid (or water) pipe 5, and a centrifugal pressure nozzle 6 for discharging feed liquid (or water) by imparting a spin thereto, are shown. The jacket pipe 3 is disposed around the conduit nozzle structure. The end portions of the pressure nozzle 6 and the air nozzle 4 are of converging construction or so shaped that their diameters diminish as they near the tip of the nozzle as shown in FIGS. 1 and 2.

Figure 3A:
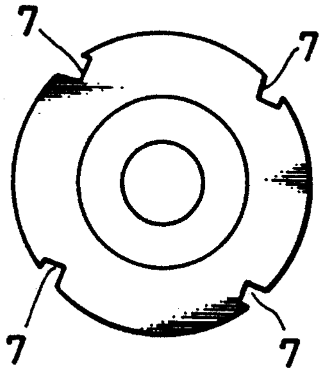
FIGS. 3 (*a*), (*b*) and (*c*) depict an example of a slit used for the nozzle unit of the invention.
Figure 3B:
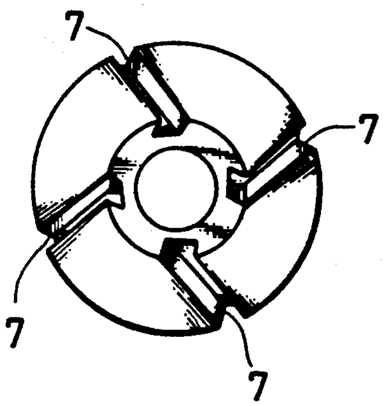
Figure 3C:
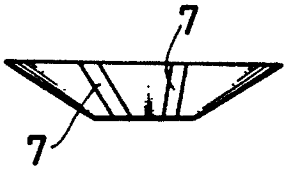
Figure 4:
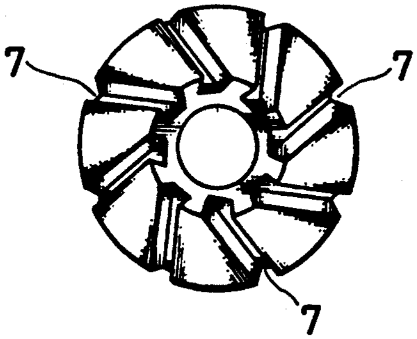
FIG. 4 also depicts an example of a slit used for the nozzle unit of the present invention.

For the purpose of increasing spray angles of feed liquid or water, it is preferable that a gas slit 7 is provided between the pressure nozzle 6 and the air nozzle 4 or on the outer area of the pressure nozzle 6 to give swirling motion to the discharging air stream as shown in FIGS. 3 (*a*), (*b*) and (*c*) which are a top plan view, a bottom plan view, and a side view, respectively, and FIG. 4.

The spraying pressure of feed liquid or water required for the pressure nozzle 6 is appropriately determined using the following Equation I and Equation II. The former is the general equation expressing flow characteristics of a pressure nozzle while the latter expresses droplet diameters for a specific pressure nozzle used, which is an SX nozzle manufactured by Spraying Co. for one preferred embodiment of this invention.

$$W = K_1 \cdot D^2 \cdot p^{0.6} \quad \text{I}$$

where W is flow rate (kg/h), $K_1$ is coefficient, D is orifice diameter (mm), and P is pressure (kg/cm$^2$).

$$D_p = K_2 \cdot W^{-0.44} \cdot \mu^{0.16} \cdot D^{1.52} \quad \text{II}$$

where W is flow rate (kg/h), $D_p$ is liquid droplet diameter (μm), $K_2$ is coefficient, and μ is liquid viscosity (cp).

The air nozzle 4 disposed around the pressure nozzle 6 has an air velocity of 80 m/s or higher, preferably 100 m/s or higher, and generally has an air pressure of 0.1 kg/cm$^2$ or higher, preferably 0.2 kg/cm$^2$ or higher, but both air velocities and air pressures are not limited to these values. Other values beyond the above ranges may be used depending on the construction of the nozzle used.

Figure 5:
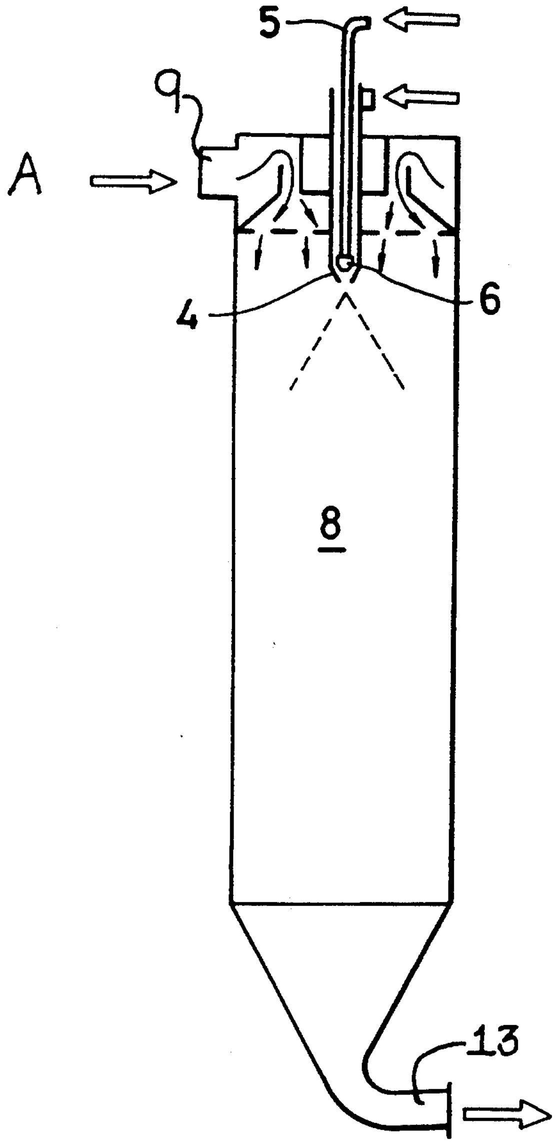
FIG. 5 is a schematic illustration of an embodiment of the spray drying apparatus equipped with the spray nozzle unit of the present invention.
Figure 6:
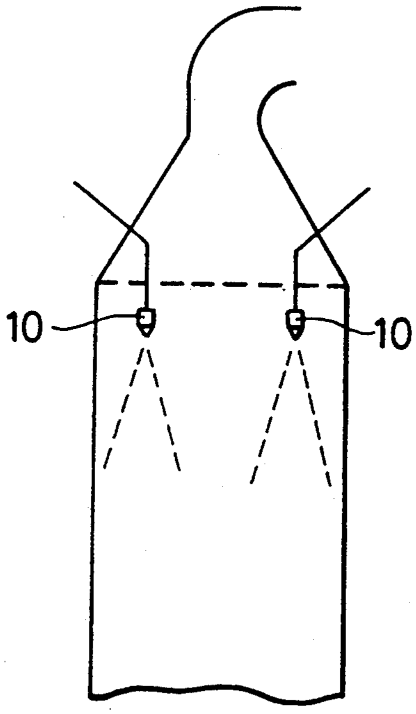
PRIOR ART FIG. 6
FIGS. 6 and 7 show conventional nozzle units.
Figure 7:
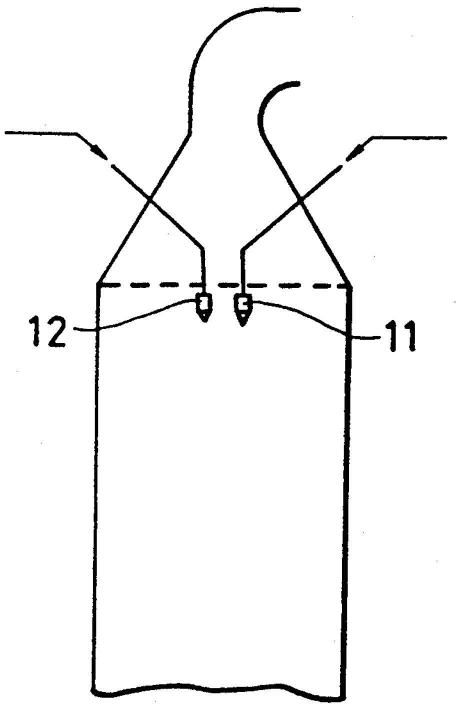
PRIOR ART FIG. 7

Referring now to FIG. 5 which is a schematic illustration of an embodiment of the spray drying apparatus equipped with the spray nozzle unit of the present invention, it will be described how the spray drying apparatus is operated.

For start-up, a feed liquid pump 1 discharges water via a feed liquid pipe 5 to a pressure nozzle 6 for spraying. Spraying of water is carried out at significantly low pressure. However, since air is blown off at high speed around the pressure nozzle 6 and swirling motion is formed in the air stream, preferably with the use of a slit 7, water is atomized into fine droplets of the desired particle size even at low pressure.

With fine water droplets of the desired particle size, every water droplet is dried with hot air as referred to as A which is blown off into a drying chamber 8 of the spray drying apparatus. Thus, no undried water is present in the drying chamber 8 and almost no temperature distribution is found in the chamber. In other words, the temperature in the drying chamber 8 is maintained constant.

Then, a feed liquid to meet a specific objective is blown off into the drying chamber 8 of the spray drying apparatus via the pressure nozzle 6 of the above nozzle unit to obtain a powder product of specified grade. Reference numeral 13 designates the outlet for exhaust gas.

When the feed liquid is actually sprayed using this nozzle unit, it is desirable to let a little air flow through the air nozzle 4 because the air can cool the nozzle unit for preventing feed liquid plugging.

Now the present invention will be described in detail in connection with the following examples:

EXAMPLE 1

Atomization tests for a feed liquid and water were made under the conditions shown in Table 1. An SX nozzle having a hexagonal cross-section manufactured by Spraying Co. was used for a pressure nozzle 6. The circumference of the nozzle tip was covered with a cylindrical pipe having a circular cross-section to obtain an annular space used for an air nozzle 4. The distance between the SX nozzle and the cylindrical pipe were about 5 mm at their widest site, and about 3 mm at their closest site. The inner diameter of the cylindrical pipe was 7 mm at its tip.

The results of these tests are shown in Table 1 below.

TABLE 1

| | Conventional Nozzle | Nozzle of This Invention | Conventional Nozzle |
|---|---|---|---|
| Feed Liquid | Poly vinylchloride (PVC) | Water | Water |
| Orifice Dia./Core (mm) | 0.787/425 | 0.787/425 | 0.787/425 |
| Spray Pressure (kg/cm$^2$) | 23 | 6 | 6 |
| Feed Rate (kg/h) | 50 | 30 | 30 |
| Liquid Viscosity (cp) | 110 | | |
| Solids Content (%) | 40 | | |
| Air Pressure (kg/cm$^2$) | | 0.26 | |
| Air Flow Rate (kg/h) | | 20.5 | |
| Air Blow Speed (m/s) | | 127.1 | |
| Inlet Temp. (°C.) | 102 | 102 | 102 |
| Outlet Temp. (°C.) | 55 | 55 | 58 |
| Particle Size (μm) | 91 | 40* | 120* |
| Spray Angle (deg.) | | about 15 | about 60 |
| Dryness | Good No Wet Material adhered | Good No Wet Material adhered | Poor Wet Material adhered to dry chamber cone section |

*denotes droplet size.
The pressure nozzle used was an SX nozzle manufactured by Spraying Co.

In addition, the test was made for the case in which swirling motion was provided in the high-speed air stream in the nozzle unit of the present invention. The results are shown below.

| | Nozzle According to This Invention |
|---|---|
| Average Droplet Diameter (μm) | 40 |
| Spray Angle (Deg.) | Approx. 30 |

EXAMPLE 2

The same nozzle as described in Example 1 was used, but nozzle diameters were changed to obtain particles of larger sizes. A large drying chamber was used in this example.

The results of these tests are shown in Table 2 below.

TABLE 2

| | Conventional Nozzle | Nozzle of This Invention | Conventional Nozzle |
|---|---|---|---|
| Feed Liquid | Poly vinylchloride (PVC) | Water | Water |
| Orifice Dia./Core (mm) | 1.067/425 | 1.067/425 | 1.067/425 |
| Spray Pressure (kg/cm$^2$) | 7 | 2 | 2 |
| Feed Rate (kg/h) | 50 | 30 | 30 |
| Liquid Viscosity (cp) | 110 | | |
| Solids Content (%) | 40 | | |
| Air Pressure (kg/cm$^2$) | | 0.26 | |
| Air Flow Rate (kg/h) | | 20.5 | |
| Air Blow Speed (m/s) | | 127.1 | |
| Inlet Temp. (°C.) | 102 | 102 | 102 |
| Outlet Temp. (°C.) | 55 | 55 | 65 |
| Particle Size (μm) | 150 | 60* | 640* Abnormal spraying |
| Spray Angle (deg.) | | about 15 | about 60 |
| Dryness | Good | Good No Wet Material | Poor Wet Material adhered to dry |

TABLE 2-continued

| | Con-ventional Nozzle | Nozzle of This Invention | Conventional Nozzle |
|---|---|---|---|
| | | adhered | chamber cone section |

*denotes droplet size.

As clearly seen from the above results, water is atomized to give fine water droplets with the nozzle according to the present invention. Dryness in the spray drying apparatus is improved since spray angles increase when swirling motion is provided in air streams discharging from the nozzles.

The effects of the present invention are listed as follows.

1) Even when water is sprayed at low pressure in the spray nozzle of the present invention, water is atomized to fine droplets which are then completely evaporated.

2) Feed liquid plugging can be prevented by the cooling of the spray nozzle unit; and 3) in a spray drying apparatus equipped with this spray nozzle unit, the spraying of a feed liquid can be performed effectively and stably even after water is sprayed at low pressure.

What is claimed is:

1. A spray drying apparatus, comprising:

a drying chamber;

a nozzle unit disposed at an upper end of said drying chamber, said nozzle unit including:

(i) a feed liquid conduit;

(ii) a centrifugal pressure nozzle connected to an end of said feed liquid conduit thereby forming a conduit nozzle structure, said centrifugal pressure nozzle swirling a stream of feed liquid passed from said feed liquid conduit therethrough;

(iii) a tubular member disposed about said conduit nozzle structure, said tubular member including a convergent nozzle at its end such that an annulus is formed between said centrifugal pressure nozzle and said convergent nozzle, wherein a gas stream is sprayed through said annulus; and (iv) means disposed between said centrifugal pressure nozzle and said tubular member for swirling said gas stream;

a gas inlet disposed at said upper end of said drying chamber for uniformly heating said drying chamber; and a gas outlet disposed at a lower end of said drying chamber for removing exhaust gas therefrom.

* * * * *